United States Patent

[11] 3,568,061

[72] Inventor Stephen J. Brolin
Bronx, N.Y.
[21] Appl. No. 724,859
[22] Filed Apr. 29, 1968
[45] Patented Mar. 2, 1971
[73] Assignee Bell Telephone Laboratories, Incorporated
Murray Hill, Berkeley Heights, N.J.

[54] BILATERAL DIGITAL TRANSMISSION SYSTEM WITH COMPANDING HAVING SAME STEP SIZE IN EACH DIRECTION
11 Claims, 3 Drawing Figs.

[52] U.S. Cl. .......... 325/38, 178/67, 325/42, 333/18
[51] Int. Cl. .......... H04b 1/00
[50] Field of Search .......... 325/38, 38.1, 39, 40, 42, 43, 44; 178/16, 67; 333/17, 18; 179/15 (ACE)

[56] References Cited
UNITED STATES PATENTS

| | | | |
|---|---|---|---|
| 2,897,275 | 7/1959 | Bowers | 325/39 |
| 3,180,939 | 4/1965 | Hall | 179/15ACE |
| 3,339,142 | 8/1967 | Varsos | 325/38.1 |
| 3,471,648 | 10/1969 | Miller | 179/15ACE |
| 3,478,170 | 11/1969 | Hanni | 325/38 |

*Primary Examiner*—Robert L. Griffin
*Assistant Examiner*—R. S. Bell
*Attorneys*—R. J. Guenther and E. W. Adams, Jr.

ABSTRACT: A digital transmission system is disclosed utilizing forward and backward acting companding for transmission from and to a central terminal to and from a plurality of remote terminals, respectively. A variable size step pulse source is used at each modulator to effectively achieve compression and another is used at each demodulator to effectively achieve complementary expansion. Apparatus is located at the central terminal which senses parameters of the message signals transmitted from and received by the central terminal, sums the sensed parameters and utilizes the sum to determine the amplitudes of the variable size step pulses produced for each modulator and demodulator.

INVENTOR
S. J. BROLIN
BY R B Arlis
ATTORNEY

BILATERAL DIGITAL TRANSMISSION SYSTEM WITH COMPANDING HAVING SAME STEP SIZE IN EACH DIRECTION

BACKGROUND OF THE INVENTION

This invention relates generally to a digital transmission system with companding which serves a number of remote terminals from a central terminal on a time division basis and, more particularly, to a delta modulation system employing companding.

A digital transmission system may comprise a central terminal and a number of remote terminals served by the central terminal. Each of the remote terminals may, in turn, serve a number of utilization devices. By using time division multiplexing techniques, the remote terminals may be served by the central terminal with a number of different transmission channels. For instance, there may be 16 remote terminals serving a total of 80 utilization devices. Probability considerations dictate that only 14 transmission channels are required to serve the 80 utilization devices. By providing these transmission channels on a time division basis, the 80 utilization devices may be fully served by allowing each transmission channel to be assigned to any remote terminal and, further, to any utilization device.

Since each utilization device is directly connected to its associated remote terminal, a transmitter and a receiver are located at each remote terminal corresponding to the subscriber served by it. Therefore, if a remote terminal serves five subscribers, it would include five transmitters and five receivers.

In digital transmission systems employing quantizing techniques for transmission, companding may be employed to minimize quantizing noise. Generally, companding entails sensing at least one parameter and using the sensed parameter to vary the step size used for the modulator in the transmitter. In the modulator, the message signal is compressed by using the variable size step pulse, while at the demodulator, the companding information is used to provide complementary expansion. In this manner, companding is accomplished by adapting the size of the step signal used for both compression and expansion to a parameter of the message signal.

One type of differential pulse code modulation employed for digital transmission is known as delta modulation. In order to minimize quantizing noise and overload distortion common to delta modulation transmission systems, an appropriate form of companding may be introduced into the delta modulation system. In this manner, the dynamic range of the message waveform is, in effect, reduced by compression at the transmitter and restored by complementary expansion at the receiver. With its dynamic range reduced, the message waveform is less subject to either quantizing noise or overload distortion.

U.S. Pat. No. 3,461,244 issued on Aug. 12, 1969 to S. J. Brolin, sets forth a delta modulation transmission system with one type of companding known as continuous companding. At the transmitter (located either at the central or remote terminals), a level sensor is utilized to compress the dynamic range of the message waveform. The level sensor senses two parameters (amplitude and slope) of the message signal. Under control of the sensed parameters, companding digits are derived which control the size of the step pulse for the delta modulator. The step pulse size may assume any value within a prescribed range. The companding digits are transmitted to the delta demodulator where, under their control, complementary expansion of the message signal is accomplished. This type of companding is known as forward acting continuous companding requiring the level sensor to be at the transmitter.

U.S. Pat. No. 3,500,441 issued on Mar. 10, 1970 S. J. Brolin, sets forth a delta modulation system with another type of forward acting companding. In that patent, the size of the step pulse used for compression and expansion may take on any of several discrete logarithmically related values. A level sensor, located at the transmitter, is used to determine which discrete size step will be utilized. As with the continuous companding scheme, companding digits are sent to the delta demodulator where, under their control, complementary expansion is accomplished. This discrete companding scheme is also forward acting since the companding information is determined at the transmitter and transmitted along with the message signal to the receiver. Therefore, forward acting companding requires a parameter sensing means which determines the companding information to be located at the transmitter.

Where a digital transmission system is to be employed between a central terminal and a plurality of remote terminals, a forward acting companding scheme requires parameter sensing means for each remotely located transmitter in order to minimize quantizing noise between the remote transmitter and central receiver. For example, with delta modulation, both the continuous and discrete forward acting companding systems would require 80 level sensors located at the remote terminals for the 80 transmitters. Since, at most, only 14 of the utilization devices may be active at any one time in accordance with the number of transmission channels available, 66 of the level sensors would be inactive.

A prior application by S. J. Brolin and J. M. Brown, application Ser. No. 718,550, filed Apr. 3, 1968, discloses a backward acting compandor to be used for transmission of a message signal from a remote to a central terminal. The digital transmission system (delta modulation) disclosed therein required a level sensor for each direction of transmission in each transmission channel. Therefore, if 14 transmission channels are to be utilized, 28 level sensors will be required. The delta modulation system disclosed in patent application Ser. No. 718,550 is merely exemplary of a digital transmission system employing quantizing and utilizing companding to minimize quantizing noise.

In addition to a level sensor per direction being required, other electronic equipment is required to operate with a level sensor for each direction of transmission. For instance, in the remote terminal, a memory is utilized at the remote transmitter to store the companding digits derived from the sensed level.

It would be advantageous if only one level sensor could be utilized per channel for both directions of transmission since significant equipment savings would be realized.

An object of the present invention is to provide a parameter detection means for determining companding information per transmission channel for a time division digital transmission system.

Another object of the present invention is to provide a single means which detects a parameter of the message signal for determining companding digits for two directions of transmission where the companding digits are to be utilized at both transmitters and receivers.

SUMMARY OF THE INVENTION

The above objects are achieved in a delta modulation scheme by sensing the levels of the message signals transmitted from and received by the central terminal, summing the sensed levels, deriving companding digits from the summed sensed levels, and utilizing the derived companding digits to provide compression for the delta modulators and complementary expansion for the delta demodulators at the central and remote terminals. Since the overall net loss in transmission is closely controlled, the message signal at the receiver output located at the central terminal will approximately equal that at the remote transmitter input. Therefore, a level sensor located at the output of the receiver located at the central terminal will accurately sense the level of the message signal transmitted from the remote terminal.

In accordance with another aspect of the present invention, it was discovered that message signal transmission would not significantly be affected if the same companding digits were utilized for both directions of transmission. A single parameter sensing means may be located at the central terminal per channel in a time division multiplex digital transmission system. The parameter sensing means senses a parameter of the message signal transmitted from the central terminal and a parameter of the message signal received at the central terminal. The sensed parameters are then summed and the sum is used to determine companding digits to be utilized for both directions of transmission.

The digital transmission system embodying the principles of the present invention may be used for telephone transmission systems. Assume that one party is talking and the other is listening. Since one direction is active and the other is relatively idle, the input to the level sensor will be essentially that of the active circuit. The active direction will have the correct step size but the direction toward the talker will, in general, have an excessively large step size. However, the talker is relatively insensitive to quantizing noise since he hears his own voice. If both directions are idle, each party will have minimum step size as desired. If both parties are talking simultaneously at an equal level, the input to the level sensor will be twice that of either direction. The subjective effect of this error is slight because of the inherent confusion of a "double-talking" situation.

By utilizing a single level sensor for both directions of transmission, the transmission will not be significantly impaired and the equipment savings will be substantial. The need for two level sensors per channel has, in accordance with the present invention, been reduced to one level sensor per channel for both directions of transmission. In addition, the auxiliary memory, filters and differentiators required for use with the additional level sensor may be eliminated. Further, transmission bandwidth is saved since the same companding digits are utilized for both directions of transmission.

As used in this application, the term "level sensor" is restricted only to comparison circuits which sense the level of the message signal. In order to appropriately present the message signal to the level sensor, the signal must first be passed through a differentiator and a rectifier. When the signals in the two directions are uncorrelated they may be directly summed before being differentiated and rectified. In this case, a differentiator, rectifier and level sensor are saved per transmission channel. However, where the two signals are correlated, each must first be passed through a differentiator and rectifier because if they are not they may cancel each other out. In this latter case, utilizing the principles of the present invention will result in a saving of a level sensor and its associated memory per channel. In addition, transmission bandwidth is also conserved.

DETAILED DESCRIPTION

This invention pertains to time division digital transmission systems utilizing companding. Prior transmission schemes utilized forward acting companding in which a large percentage of the parameter sensing means was inactive. A backward acting companding scheme was set forth in U.S. Pat. application Ser. No. 718,550, filed by S. J. Brolin and J. M. Brown on Apr. 3, 1968.

By utilizing the principles of that invention, significant equipment savings were realized since only one parameter sensing means was assigned to each channel for each direction of transmission. One parameter sensing means is utilized for deriving companding information for transmission from the central terminal to a remote terminal while the other parameter sensing means, located at the central terminal, determines the companding information for the message signal transmitted from the remote to the central terminal.

It has been discovered, though, that further savings may be achieved by utilizing only a single parameter sensing means for both directions of transmission. In addition to equipment savings, transmission bandwidth is conserved since the companding digits for both directions of transmission are the same. As above described, the message signal transmission is not significantly degraded by using a single parameter sensing means for both directions of transmission. For illustrative purposes, the principles of the present invention are shown with one type of digital transmission system, a delta modulation transmission system.

Figure 1:
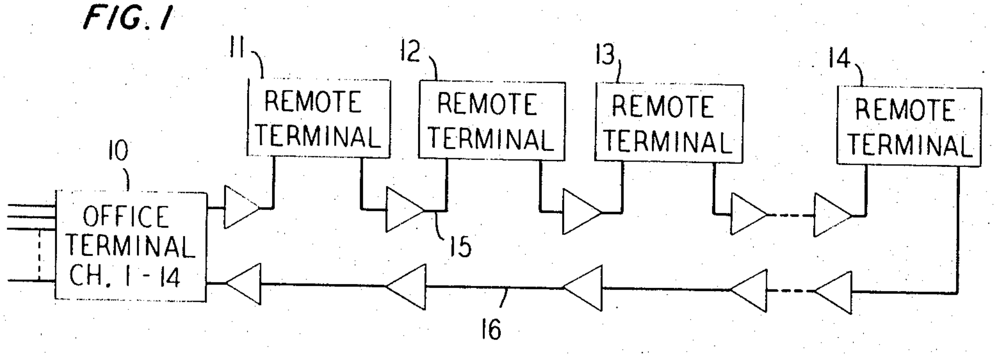
FIG. 1 is a block diagram of a complete multichannel subscriber carrier system embodying the various features of the invention.

The subscriber carrier system illustrated in block diagram form in FIG. 1 includes an office terminal, a plurality of remote terminals including terminals 11 through 14, an outward repeated line 15 and an inward repeated line 16. Office terminal 10 may be located at a telephone central office and contains delta modulation transmitting and receiving terminal equipment for 14 telephone message channels. With the aid of concentration, these 14 channels can provide private line telephone service for as many as 80 subscribers. The 14 message channels are combined in time division multiplex to service the remote terminals and, in turn, the telephone subscribers. The remote terminals are, in turn, spaced at intervals along outward repeated line 15 and each contains delta modulation transmitting and receiving terminal equipment for one or more telephone message channels. At each remote terminal, delta modulation receiving equipment intercepts the channel or channels with which it is at the moment associated and delta modulation transmitting equipment reinserts it on outward line 15. All 14 message channels return to office terminal 10 in time division multiplex on inward line 16.

Each remote terminal may serve a single message channel or, alternatively and even more likely, different channels simultaneously. With concentration, each remote terminal always serves the same subscribers but is not always associated with the same time division channels. Rather, different channels may be associated with different terminals under different conditions of operation. At office terminal 10 in FIG. 1 and at each remote terminal, suitable hybrid networks separate the two opposite directions of transmission in the respective message channels. For each channel a delta modulator converts the incoming waveform into binary digits for transmission out over the line and a delta demodulator converts received binary digits back into the original message waveform.

Time division multiplex is associated with the remote terminals while permanent line connections are maintained between the remote terminals and their associated subscribers. Consequently, the remote terminals must contain the same number of delta modulators and demodulators as subscribers served by the terminal.

U.S. Pat. application Ser. No. 718,550, filed Apr. 3, 1968 by S. J. Brolin and J. M. Brown discloses a digital transmission system employing companding which enables significant equipment savings to be realized. By utilizing the principles of that invention in a digital transmission system, a parameter sensing means is utilized for each direction of transmission and two parameter sensing means are assigned per transmission channel. It has been further discovered that further equipment reduction and transmission bandwidth savings may be realized by utilizing a single parameter sensing means for both directions of transmission. As described above, the message signal transmitted is not significantly degraded.

Figure 2:
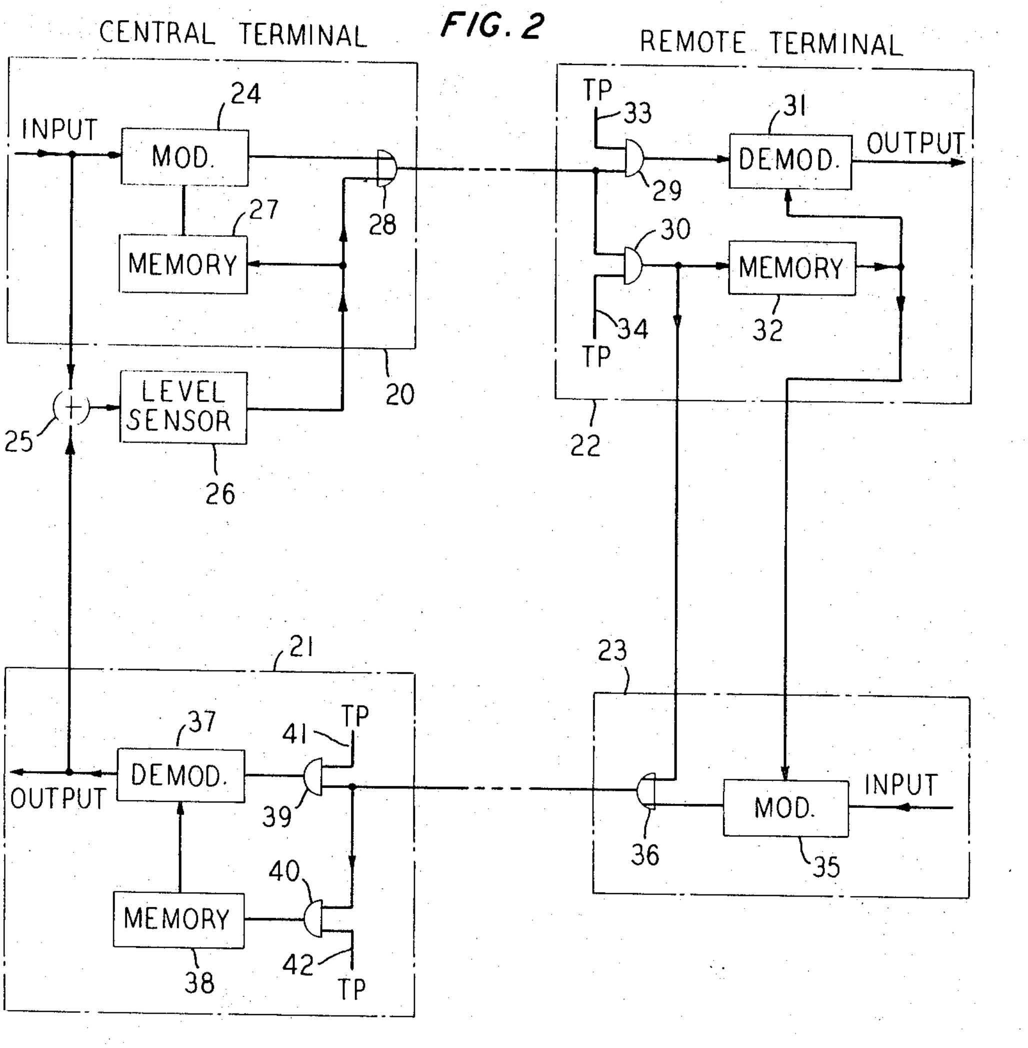
FIG. 2 is a more detailed block diagram of the transmitters and receivers located at the central and remote terminals.

FIG. 2 is a block diagram of a type of digital transmission system, a delta modulation system which, in accordance with the present invention, has a single parameter sensing means assigned to each active transmission channel for both directions of transmission rather than one for each direction of transmission.

Transmitter 20 and receiver 21 are located at the central terminal, while receiver 22 and transmitter 23 are located at the remote terminal. Receiver 22 and transmitter 23 are associated with a subscriber. By utilizing time division multiplex, transmitter 20 and receiver 21 at the central terminal may be associated with any remote receiver and transmitter using the active transmission channel associated with transmitter 20 and receiver 21. For purposes of illustration, though, only one set of transmitting and receiving equipment located at the remote terminal is shown.

An analogue input is applied to transmitter 20 and is supplied to modulator 24 and to summing device 25. The single parameter sensing means utilized for both directions of transmission receives the sum of the message signals transmitted in both directions. To this end, the output of summing device 25 is supplied to level sensor 26. Summing device 25 receives not only the analogue input to transmitter 20 but also the reformed analogue output transmitted by transmitter 23 and received at receiver 21.

The principles of the present invention are applicable to any digital transmission system in which companding is employed to minimize quantizing noise and, for purposes of illustration, the principles of the present invention are utilized with a delta modulation system. The parameter sensing means used in a digital system will be replaced by a level sensor used for delta modulation. The output of summing device 25 is applied to level sensor 26, the output of which is supplied to memory 27 and also transmitted to the remote terminal through OR-gate 28.

Memory 27 under control of the output of level sensor 26 produces companding digits which determine a variable size step pulse for delta modulator 24. The variable size step pulse applied to modulator 24 is used to compress the analogue input applied thereto. These same companding digits are utilized in remote receiver 22 to provide complementary expansion for the compressed message signal.

Digital signals representative of the companding information derived in transmitter 20 are received from the remote terminal at AND-gates 29 and 30 and are gated respectively to demodulator 31 and memory 32 by timing signals applied to terminals 33 and 34 of AND-gates 29 and 30, respectively. The companding digits received by memory 32 are used to provide a variable size step pulse for demodulator 31. Since the variable size step pulse for demodulator 31 is the same as the variable size step pulse derived in memory 27, complementary expansion of the compressed message signal at remote receiver 22 may be accomplished.

The output of demodulator 31 may be directly transmitted to a subscriber. The variable step size pulse utilized for demodulator 31 is also used to control modulator 35 which is part of remote transmitter 23. The variable step size pulse produced by memory 32 provides compression for the input message signal received at modulator 35. The companding information, along with the message signal, is recirculated back to the central terminal through OR-gate 36.

The digital signals received in receiver 21 include both the compressed message signal derived in modulator 35 and the companding information applied to memory 32. This digital information is applied to demodulator 37 and memory 38 through AND-gates 39 and 40, respectively, under control of timing pulses applied to the inputs of AND-gates 39 and 40 on input terminals 41 and 42, respectively.

The companding information received in memory 38 is utilized to provide a variable size step pulse for delta demodulator 37. Since the same companding information is used to compress the message signal at transmitter 23 as is used to expand the message signal at receiver 21, complementary expansion is achieved. The reformed analogue signal from demodulator 37 is supplied to both summing device 25 and other interface connections with the central terminal.

Since the overall net loss between transmitter 23 and receiver 21 is closely controlled, the level received at the output of receiver 21 may be made to approximately equal that applied at the input of modulator 35. Level sensor 26 produces a digital signal which is transmitted through OR-gate 28 back to memory 32 serving both the remote transmitter 23 and receiver 22. Memory 32 produces a variable size step pulse which is used in modulator 35. The step produced in memory 32 is responsive to prior companding digits developed by level sensor 26 and is delayed by the total round trip transmission time, but since the probability of rapid amplitude variation is alight, the amount of compression in modulator 35 is suitable to the new input signal at modulator 35.

Since exact complementary expansion must occur at the receiver, the level sensing bits are recirculated back to receiver 21 with the message signal that has been compressed in accordance with the sensed level. This enables the step size at receiver 21 to be changed at exactly the same place in the message bit stream as in transmitter 23. If level sensor 26 were to expand the message waveform at receiver 21 differently from that compressed in the transmitter, significant transmission problems such as net loss fluctuations and distortion would ensue. Therefore, the amount of compression determined by level sensor 26 is recirculated back to receiver 21 with the message signal that has been compressed in transmitter 23, as determined by level sensor 26.

The digital information from level sensor 26 is applied to memory 32 through AND-gate 30 with appropriate timing signals applied to terminal 34. The output of AND-gate 30 is applied to memory 32 and to OR-gate 36. The output from modulator 35 is also applied to OR-gate 36 for transmission to receiver 21. Digital information transmitted from transmitter 23 is applied to AND-gates 39 and 40 which are gated to memory 38 and demodulator 37, respectively, under control of timing pulses applied to terminals 42 and 41, respectively. Memory 38, under control of the sensed level information recirculated, produces a variable step which controls delta demodulator 37 in order to provide complementary expansion.

Other methods may be devised for achieving complementary expansion. For instance, rather than recirculating the companding information back to receiver 21, the companding information may be stored in a buffer located in receiver 21, and, by using synchronization signals to determine the proper location of the companding information in the data bit stream, complementary expansion may be accomplished in receiver 21.

A single level sensor for determining companding digits for both directions of transmission in a transmission channel has been disclosed. It has been discovered that the message signal transmission is not significantly degraded when a single level sensor is used for both directions of transmission.

The digital transmission utilized in the present invention may be applied to a telephone transmission system. Assume one party is talking and the other is listening. Since one direction is active and the other is relatively idle, the input to the level sensor will be essentially that of the active circuit. The active direction will have the correct step size but the direction toward the talker will, in general, have an excessively large step size. However, the talker is relatively insensitive to quantizing noise since he hears his own voice. If both directions are idle, each will have a minimum step size as desired. If both parties are talking simultaneously at an equal level, the input to level sensor 26 will be 3 decibels higher than that of either direction if the signals are uncorrelated, and if each is passed through a differentiator and rectifier before being applied to the level sensor when the signals are correlated. The subjective effect of this three decibel error is slight because of the inherent confusion of a "double-talking" situation.

Utilizing the principles of the present invention, at least a level sensor per channel and a memory per line is conserved over the prior art. Where the signals are uncorrelated, a differentiator and rectifier per channel will also be saved. This equipment savings is substantial and, in addition, transmission bandwidth is also conserved since the same companding digits are utilized for both directions of transmission.

The principles of the present invention have been described with reference to a delta modulation transmission system, but the delta modulation system is merely one type of digital transmission system. In a digital transmission system employing companding to minimize quantizing noise, the level sensor of the delta modulation system may be replaced by a parameter sensing means for determining the companding information.

Figure 3:
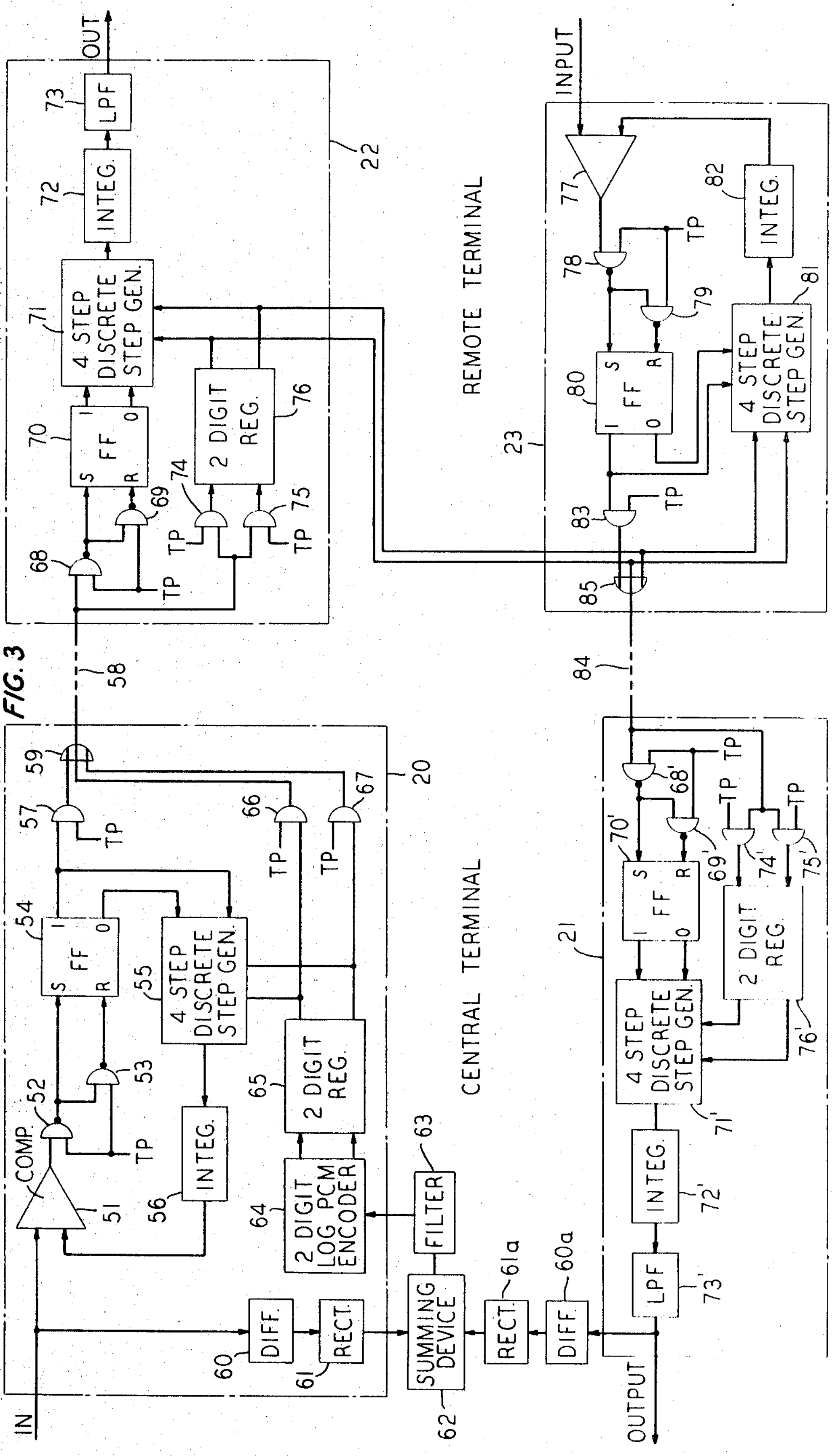
FIG. 3 is an even more detailed block diagram of the transmitters and receivers located at the central and remote terminals.

FIG. 3 is a more detailed representation of transmitters 20 and 23 and receivers 21 and 22 of FIG. 2. For purposes of illustration, the transmission system in FIG. 3 is shown with discrete companding. The principles of the present invention may be applied to continuous companding by referring to the teachings of the present invention and those disclosed in U.S. Pat. No. 3,461,244 issued Aug. 12, 1969 to S. J. Brolin.

The message waveform from the central office to be transmitted by transmitter 20 is applied to one input of comparator 51 which is a two-input circuit delivering an output having the polarity of the difference between its inputs. The output of comparator 51 is connected to a sample-and-hold circuit made up of a pair of inverting AND-gates 52 and 53 and a bistable multivibrator or flip-flop 54. The inverting property of AND-gates 52 and 53 is indicated symbolically by the small circles at their respective outputs. As illustrated in FIG. 3, the output of comparator 51 is connected to one input of AND-gate 52 and the output of AND-gate 52 is connected to one input of AND-gate 53. Channel pulses are applied to the other inputs of AND-gates 52 and 53. The output of AND-gate 52 is connected to the set input of flip-flop 54, while the output of AND-gate 53 is connected to the reset input R.

When the output of comparator 51 is positive while a channel pulse is present, AND-gate 52 applies a negative voltage to the set input of flip-flop 54 and AND-gate 53 applies a positive voltage to the reset input. Under such conditions, the output state of flip-flop 54 is as illustrated, with binary 1 appearing at the upper or set output and binary 0 appearing at the lower or reset output. When the output of comparator 51 is negative during a channel pulse, AND-gate 52 applies a positive voltage to the set input of flip-flop 54 and AND-gate 53 applies a negative voltage to the reset input. Under such conditions, the output state of flip-flop 54 is opposite to that illustrated, with binary 0 appearing at the upper or set output and binary 1 appearing at the lower or reset output. By way of example, in both states of flip-flop 54 binary 1 is represented by a positive voltage and binary 0 by a zero voltage.

The outputs of flip-flop 54 are connected to respective inputs of a four-step discrete step signal generator 55, which generates a positive-going step signal when flip-flop 54 is in the state illustrated and a negative-going step signal when flip-flop 54 is in the opposite state. The output of step signal generator 55 is connected to an integrating circuit 56, and the output of integrator 56 is connected to the remaining input of comparator 51. Integrator 56 may include one or more stages of integration, as desired.

Output digits are taken from the upper or set output of flip-flop 54 and applied to one input of AND-gate 57, the other input of which is supplied with channel pulses delayed slightly from those applied to AND-gates 52 and 53. The output from AND-gate 57 is supplied to the outgoing line 58 through an OR-gate 59. Except for the four-step discrete step generator 55, the portion of the apparatus illustrated in FIG. 3 which has thus far been described is a conventional delta modulator.

The sample-and-hold circuit samples the output of comparator 51 at a rate sufficiently high to permit the audio message waveform to be reproduced with acceptable accuracy. If the output of comparator 51 is positive, indicating that the instantaneous amplitude of the message waveform is larger than the output of integrator 56, a positive step signal is provided by generator 55 and binary 1 is transmitted through AND-gate 57 and OR-gate 59. If the output of comparator 51 is negative, indicating that the instantaneous amplitude of the message waveform is smaller than the output of integrator 56, the step signal produced by generator 55 is negative and binary 0 is transmitted through AND-gate 57 and OR-gate 59.

As set forth in U.S. Pat. No. 3,500,411 issued to S. J. Brolin, the dynamic range of the delta modulator itself is enhanced by adapting the size of the positive-going and negative-going step signals produced by generator 55 to the volume level and frequency content of the message signal on a discrete basis.

As shown in FIG. 2 above, the level sensor, in accordance with the present invention, is located at the central station and utilized for both directions of transmission. By locating the level sensor at the central terminal, it may be assigned to an active channel of transmission, and the number of level sensors required will be equal to the number of channels. As further described above, the level sensor senses the sum of the message signals transmitted from and received by the central terminal.

Since a delta modulator overloads on slope, a level sensor made up of differentiator 60 and rectifier 61 in tandem is connected from the input of transmitter 20 to summing device 62, the output of which is passed through low-pass filter 63 to a tow-digit pulse code modulator encoder 64. Encoder 64 is a pulse code modulation encoder of a type well known in the art, producing a two-digit parallel binary code output on its two output leads. Encoder 64 includes level sensors to derive the two-digit binary code, and effectively, is the level sensor referred to in this application. In other words, an encoder is saved per transmission channel when compared with the prior art by employing the principles of the present invention.

As a two-digit encoder, encoder 64 encodes up to four different levels. These are preferably logarithmically related to one another, 12 decibels apart. The most significant digit of the binary code output of pulse code modulation encoder 64 appears on the upper of the two output leads and the least significant digit appears on the lower.

To this point, a delta modulator with forward acting companding has been set forth, with the exception of summing device 62. As shown in FIG. 2, a single level sensor is utilized for both directions of transmission. To this end, the reformed output from receiver 21 is also passed through a level sensor made up of differentiator 60*a* and rectifier 61*a* before being passed to summing device 62. Summing device 62 then sums the message signal received by receiver 21 and that transmitted by transmitter 20. The summation of these signals is then passed through filter 63 to encoder 64. By using a single level sensor and summing the oppositely directed message signals, no significant transmission system degradation is suffered. The reasons for this have been set forth above.

Separate differentiators and rectifiers are required, as shown, for the message signal transmitted from transmitter 20 and received by receiver 21 when the signals are correlated. When the message signals are uncorrelated, as is more common, the signals may directly be applied to a summing device and the resultant summed signal may be passed through a differentiator and rectifier before being applied to filter 63 and encoder 64. In this case, further equipment savings are realized since only one differentiator and rectifier are required per transmission channel.

The output from pulse code modulation encoder 64 is gated into a two-digit register 65 and stored there until the next cycle when it is read out. On the output side of register 65, the most significant digit from encoder 64 which appears on the upper lead is supplied to one input of AND-gate 66 and to step generator 55, while the least significant digit which appears on the lower lead is supplied to one input of AND-gate 67 and to step generator 55.

The output leads from register 65 supply the digits carried by them directly as control signals to step signal generator 55 which produces one of four discrete step signal levels. These levels, which are controlled by the two-digit binary code group originally generated by pulse code modulation encoder 64, are preferably logarithmically related to one another, 12 decibels apart, and may be either positive-going or negative-going, depending upon the state of flip-flop 54. The step signal used in the delta modulation process is thus made to increase in magnitude by discrete steps as the slopes of the sensed message signals increase, and to decrease in magnitude by discrete steps as the slopes decrease.

The output of the step generator is passed through integrator 56 and applied to the second input of comparator 51. When the output of integrator 56 exceeds the message signal applied to the other input to comparator 51, a change in polarity of the output of comparator 51 takes place.

The other inputs of AND-gates 66 and 67 are supplied with specified timing pulses. The outputs of AND-gates 66 and 67 form two of the three inputs of OR-gate 59, the output of which is transmitted from the central to the remote station by way of transmission line 58. Receiver 22, in essence, is a delta demodulator serving not only to decode the received message digits and convert them back to the original message waveform, but also to provide discrete syllabic expansion which is complementary to the compression performed at the transmitting terminal in the associated delta modulator.

As shown, transmission line 58 is connected to a sample-and-hold circuit made up of a pair of inverting AND-gates 68 and 69 and a flip-flop 70. Transmission line 58 is connected to one input of AND-gate 68 and the output of AND-gate 68 is connected to one input of AND-gate 69. The remaining inputs of AND-gates 68 and 69 are supplied with channel pulses. The output of AND-gate 68 is also connected to set input S of flip-flop 70 and the output of AND-gate 69 is connected to the reset input R.

The set and reset outputs of flip-flop 70 are connected to respective inputs of a four-step discrete step signal generator 71 which is substantially identical to step signal generator 55 located at transmitter 20. Step signal generator 71 produces a positive-going step signal when flip-flop 70 is in the state illustrated, and a negative-going signal when flip-flop 70 is in the opposite state. The output of step signal generator 71 is connected through an integrator 72 to a low-pass filter 73 to recreate the originally encoded message waveform. Integrator 73 is essentially identical to integrator 56 located in transmitter 20 and, like it, may include one or more stages of integration as desired.

In operation, the incoming binary message digits carried by transmission line 58 cause the sample-and-hold circuit, step signal generator 71 and integrator 72 to track the action of the sample-and-hold circuit, step signal generator 55 and integrator 56 in transmitter 20. A received binary 1 causes a negative voltage to appear at the output of AND-gate 68 and a positive voltage to appear at the output of AND-gate 69. Flip-flop 70 is switched to the state illustrated and step signal generator 71 produces a positive-going step signal. A received binary 0 causes a positive voltage to appear at the output of AND-gate 68. Flip-flop 70 is switched to the state opposite that illustrated and step signal generator 71 produces a negative-going step signal.

Receiver 22 is provided with a discrete syllabic expansion complementary to the discrete syllabic compression provided the audio delta modulator in transmitter 20. This syllabic expansion is provided by a pair of AND-gates 74 and 75 and a two-digit register 76. The digital information carried by transmission line 58 is supplied to one input each of AND-gates 74 and 75 which serve to select the incoming companding digits with the aid of timing pulses. Register 76 is substantially the same as register 65 in transmitter 20 and, like it, inverts the digits appearing on its two output leads. These inverted companding digits are applied as control signals to step signal generator 71, causing the latter to track the operation of step signal generator 55.

In accordance with one feature of the present invention, the companding digits produced by two-digit register 76 in receiver 22 are used to control the size of the step signal produced for the delta modulator in transmitter 23.

The message waveform from a subscriber is applied to one input of comparator 77 which is a two-input circuit similar to comparator 51 in transmitter 20, delivering an output having the polarity of the difference between its inputs. The output of comparator 77 is connected to a sample-and-hold circuit made up of a pair of inverting gates 78 and 79 and a bistable multivibrator 80. The inverting property of AND-gates 78 and 79 is indicated symbolically by the small circles at their respective outputs. As illustrated in FIG. 3, an output of comparator 77 is connected to one input of AND-gate 78 and the output of AND-gate 78 is connected to one input of AND-gate 79. Channel pulses are applied to the other inputs of AND-gates 78 and 79. The output of AND-gate 78 is connected to the set input S of flip-flop 80, while the output of AND-gate 79 is connected to the reset input R.

When the output of comparator 77 is positive while a channel pulse is present, AND-gate 78 applies a negative voltage to the set input of flip-flop 80 and AND-gate 79 applies a positive voltage to the reset input. Under such conditions, the output state of flip-flop 80 is as illustrated, with binary 1 appearing at the upper or set output and binary 0 appearing at the lower or reset output. When the output of comparator 77 is negative during a channel pulse, AND-gate 78 applies a positive voltage to the set input of flip-flop 80 and AND-gate 79 applies negative voltage to the reset input. Under such conditions the output state of flip-flop 80 is opposite to that illustrated, with binary 0 appearing at the upper or set output and binary 1 appearing at the lower or reset output. By way of example, in both states of flip-flop 80, binary 1 is represented by a positive voltage and binary 0 by a zero voltage.

The outputs of flip-flop 80 are connected to respective inputs of a four-step discrete step signal generator 81 which generates a positive-going step signal when flip-flop 80 is in the state illustrated, and a negative-going step signal when flip-flop 80 is in the opposite state. The output of step signal generator 81 is connected to integrating circuit 82 and the output of integrator 82 is connected to the remaining input of comparator 77. Integrator 82 may include one or more stages of integration as desired.

Output digits are taken from the upper or set output of flip-flop 80 and applied to one input of AND-gate 83, the other input of which is supplied with channel pulses delayed slightly from those applied to AND-gates 78 and 79. The output from AND-gate 83 is supplied to the return line 84 through OR-gate 85. Except for the four-step discrete step generator 81, the operation of the apparatus illustrated as transmitter 23 which has thus far been described, is a conventional modulator. The sample-and-hold circuit samples the output of comparator 77 at a rate sufficiently high to permit the audio message waveform to be reproduced with acceptable accuracy. If the output of comparator 77 is positive, indicating that the instantaneous amplitude of the message waveform is larger than the output of integrator 82, a positive step signal is provided by generator 81 and binary 1 is transmitted through AND-gate 83 and OR-gate 85. If the output of comparator 77 is negative, indicating that the instantaneous amplitude of the message waveform is smaller than the output of integrator 82, the step signal produced by generator 81 is negative and binary 0 is transmitted through AND-gate 83 and OR-gate 85.

In accordance with one aspect of the present invention, the companding digits derived in encoder 64 are used to control the size of the step signal produced by generator 81. To this end, the output of two-digit register 76 is used not only to control step generator 71 but also step generator 81. The companding digits utilized to control generator 81 are transmitted with a message signal from transmitter 23 to receiver 21. In accordance with another aspect of the present invention, a memory (two-digit register) is conserved per line (subscriber) since the same companding digits are used for receiver 22 and transmitter 23. These companding digits are stored in register 76, the output of which controls both step generators 71 and 81.

Receiver 21 provides complementary expansion for the message signal transmitted from transmitter 23. The operation of receiver 21 is the same as that of receiver 22. To this end, the components of receiver 21 have been designated with prime numerals to indicate the same apparatus as is found in receiver 22. By referring to the detailed description of receiver 22 found above and substituting the primed numerals for the nonprimed numerals, the operation of receiver 21 may be understood. The reformed output of receiver 21 is supplied to a level sensor made up of differentiator 60a and rectifier 61a connected in tandem.

FIG. 3 illustrates an embodiment of the principles of the present invention as applied to delta modulation transmission systems. As stated above, the principles of the present invention may be utilized in any digital transmission system utilizing companding to minimize quantizing noise in which transmission is to and from a transmitter-receiver combination from and to another transmitter-receiver combination. By utilizing one parameter sensing means, significant equipment savings may be realized in addition to conserving transmission bandwidth.

It is to be understood that the above-described arrangement is illustrative of the application of the principles of the invention. Numerous other embodiments may be devised without departing from the spirit and scope of the invention.

I claim:

1. A delta modulation system with syllabic companding for transmission of one message signal from a central terminal to a remote terminal and for transmission of a second message signal from said remote terminal to said central terminal which includes at said central terminal:

a delta modulator and a delta demodulator, with said delta modulator comprising;

a first comparator having a single output and a pair of inputs;

means to sample the output of said first comparator on a periodic repetitive basis;

an output transmitter and a first step signal generator both connected to respond to the sampled output of said first comparator;

said output transmitter producing a binary digit of one kind for transmission to said remote terminal whenever the sample is positive and a binary digit of another kind for transmission to said remote terminal whenever the sample is negative and said first step signal generator producing a step signal of one polarity whenever the sample is positive and a step signal of the opposite polarity whenever the sample is negative;

a first integrator connected to receive the step signal produced by said first step signal generator;

means to supply the message signal to be transmitted from said central terminal to said remote terminal and the output from said first integrator to the respective inputs of said first comparator;

first means to controllably vary the magnitude of the step signal produced by said first step signal generator;

said delta demodulator comprising a second step signal generator connected to respond to binary digits received from said remote terminal;

said second step signal generator producing a step signal of one polarity whenever the received binary digit is of one kind and a step signal of the opposite polarity whenever the received binary digit is of the other kind;

second means to controllably vary the magnitude of the step signal produced by said second step signal generator;

a second integrator connected to receive the step signal produced by said second step signal generator;

a low-pass filter connected to the output of said second integrator to recreate the message signal encoded at said remote terminal;

means to sense the maximum slope of said message signal transmitted from said central to said remote terminal;

means to sense the maximum slope of said recreated message signal;

means to sum the sensed maximum slopes;

means responsive to the summed signal to produce companding digits;

said remote terminal comprising a delta modulator and a delta demodulator;

said remote delta demodulator comprising a third step signal generator connected to respond to binary digits received from said output transmitter in said delta modulator in said central terminal;

said third step signal generator producing a step signal of one polarity whenever the received binary digit is of one kind and a step signal of the opposite polarity whenever the received binary digit is of the other kind;

third means to controllably vary the magnitude of the step signal produced by said third step signal generator;

a third integrator connected to receive the step signal produced by said third step signal generator;

a low-pass filter connected to the output of said third integrator to recreate the message signal encoded at said central terminal;

said delta modulator at said remote terminal comprising a second comparator having a single output and a pair of inputs;

means to sample the output of said second comparator on a periodic repetitive basis;

an output transmitter and a fourth step generator both connected to respond to the sampled output of said second comparator;

said last-named output transmitter producing a binary digit of one kind for transmission to said delta demodulator at said central terminal whenever the sample is positive and a binary digit of another kind for transmission to said delta demodulator at said central terminal whenever the sample is negative, and said fourth step generator producing a step signal of one polarity whenever the sample is positive and a step signal of the opposite polarity whenever the sample is negative;

a fourth integrator connected ro receive the step signal produced by said third step signal generator;

means to supply the message signal from a utilization device and the output of said fourth integrator to the respective inputs of said second comparator;

said third controllably varying means connected to said fourth signal generator to controllably vary the magnitude of the step signal produced by said fourth step signal generator; and means responsive to said derived companding digits to control the magnitudes of the step signals at said delta modulators at said central and remote termir.als and at said delta demodulators at said central and remote terminals.

2. Apparatus as set forth in claim 1 wherein said first, second, third and fourth step signal means comprises means to produce a plurality of discrete step sizes.

3. Apparatus as set forth in claim 2 wherein said derived companding digits are applied to said first, second, third and fourth step signal means in succession.

4. A digital transmission system with companding comprising:

a first terminal comprising a first transmitter and a first receiver;

a second terminal comprising a second transmitter and a second receiver;

said first transmitter comprising a first modulator and first means to apply a controllably variable magnitude step pulse to said first modulator;

said first receiver comprising a first demodulator and second means to apply a controllably variable magnitude step pulse to said first demodulator;

said second transmitter comprising a second modulator and third means to apply a controllably variable magnitude step pulse to said second modulator;

said second receiver comprising a second demodulator and fourth means to apply a controllably variable magnitude step pulse to said second demodulator; and a single parameter sensing means located at said first terminal and responsive to a parameter of the message signal transmitted and a parameter of the reconstructed message signal received at said first terminal for generating companding control signals for controlling the outputs of said first and second variable magnitude step pulse means and for the transmission to said second terminal for controlling the output of said third and fourth variable magnitude step pulse means.

5. Apparatus as set forth in claim 4 wherein said single parameter sensing means is responsive to the sum of a parameter of the message signal transmitted and a parameter of the message signal received at said first terminal.

6. Apparatus as set forth in claim 4 wherein said single parameter sensing means comprises:
- means to sense a parameter of the message signal transmitted from said first transmitter to said second receiver;
- means to sense a parameter of the message signal transmitted from said second transmitter to said first receiver;
- means to sum the sensed parameters;
- an *n* digit pulse code encoder connected to encode the sum of the sensed parameters in terms of *n* binary digits; and
- means to transmit *n* binary digits to said second receiver, second transmitter and first receiver to control the magnitude of said fourth, third and second variable magnitude step pulse means, respectively.

7. Apparatus as set forth in claim 4 wherein said first and second modulators comprise delta modulators and said first and second demodulators comprise delta demodulators.

8. A digital system with companding employed for transmission comprising:
- a central terminal having a plurality of modulator-demodulator pairs;
- a plurality of remote terminals, each terminal having a plurality of modulator-demodulator pairs, the total number of remote modulator-demodulator pairs being greater than the number of central modulator-demodulator pairs;
- a plurality of transmission channels, each coupled to a different one of said plurality of central modulator-demodulator pairs, and each coupled selectively to a different remote modulator-demodulator pair;
- first and second means in each modulator and demodulator, respectively, in said central modulator-demodulator pairs to provide a controllably variable size step for each modulator and demodulator of said central modulator-demodulator pairs;
- third and fourth means in each modulator and demodulator, respectively, in said remote modulator-demodulator pairs to provide a controllably variable size step for each modulator and demodulator of said remote modulator-demodulator pairs; and
- a plurality of single parameter-sensing means, one of which is located at each of said plurality of central modulator-demodulator pairs with each one coupled to a different transmission channel and responsive to a parameter of the message signal transmitted and to a parameter of the reconstructed message signal received at each respective central modulator-demodulator pair for generating companding control signals for controlling the first and second controllably variable size step means in each modulator and demodulator, respectively, in each said central modulator-demodulator pair and for transmission to said third and fourth controllably variable size step means in each modulator and demodulator, respectively, in each said remote modulator-demodulator pair.

9. Apparatus as set forth in claim 8 wherein said plurality of parameter sensing single means located at said central modulator-demodulator pairs is responsive to the sum of a parameter of the message signal transmitted and a parameter of the message signal received at said central terminal.

10. Apparatus as set forth in claim 8 wherein each of said plurality of single parameter sensing means comprises:
- means to sense a parameter of the message signal transmitted from said central modulator to said remote demodulator;
- means to sum the sensed parameters;
- an *n* digit pulse code encoder connected to encode the sum of the sensed parameters in terms of *n* binary digits; and
- means to transmit said *n* binary digits to said remote demodulator, remote modulator and central demodulator to control the magnitude of said fourth, third and second variable size step means.

11. Apparatus as set forth in claim 8 wherein said central and remote modulators comprise delta modulators and said central and remote demodulators comprise delta demodulators.